United States Patent [19]
Miyagawa et al.

[11] 3,943,193
[45] Mar. 9, 1976

[54] CHLOROPRENE RUBBER COMPOSITION HAVING HIGH THERMAL AGING RESISTANCE AND OIL RESISTANCE

[75] Inventors: Toshio Miyagawa; Norio Inoue; Tadayuki Suenaga, all of Shin-nanyo, Japan

[73] Assignee: Toyo Soda Manufacturing Co., Ltd., Japan

[22] Filed: Nov. 13, 1973

[21] Appl. No.: 415,442

[30] Foreign Application Priority Data
Nov. 16, 1972 Japan.............................. 47-114286

[52] U.S. Cl............................... 260/890; 260/42.34
[51] Int. Cl.²...................... C08K 3/22; C08L 11/00
[58] Field of Search................ 260/86.3, 890, 42.34

[56] References Cited
UNITED STATES PATENTS

| | | | |
|---|---|---|---|
| 2,464,268 | 7/1946 | Barnes | 260/86.3 |
| 2,892,906 | 6/1959 | Moore | 260/890 |
| 3,147,318 | 9/1964 | Carrcroft | 260/890 |
| 3,261,789 | 7/1966 | Berger et al. | 260/890 |

Primary Examiner—Murray Tillman
Assistant Examiner—J. Ziegler
Attorney, Agent, or Firm—Oblon, Fisher, Spivak, McClelland & Maier

[57] ABSTRACT

A chloroprene rubber composition having a high resistance to thermal aging and a high oil resistance is prepared by admixing a chloroprene-methacrylate copolymer with chloroprene rubber and vulcanizing the mixture in the presence of quinone dioxime dibenzoate and a metal oxide.

4 Claims, No Drawings

CHLOROPRENE RUBBER COMPOSITION HAVING HIGH THERMAL AGING RESISTANCE AND OIL RESISTANCE

BACKGROUND OF THE INVENTION

1. Field of the Invention:

This invention relates to a chloroprene rubber composition having a higher resistance to thermal aging and a higher oil resistance than those of conventional chloroprene vulcanized rubber.

2. Description of the Prior Art:

Chloroprene type rubber is widely used in various fields because of both its high resistance to thermal aging and high oil resistance. However, new uses of these rubbers require still greater resistance to thermal aging and oil resistance than the conventional chloroprene rubbers are capable of providing

SUMMARY OF THE INVENTION

Accordingly, one object of this invention is to provide a chloroprene rubber composition having both a higher resistance to thermal aging and a higher oil resistance than those of the conventional chloroprene rubber.

Another object of this invention is to provide a process for preparing a vulcanized composition comprising a chloroprene rubber and a choroprene-methacrylate copolymer.

Briefly, these and other objects of the invention as hereinafter will become apparent are achieved by vulcanizing a blend of a chloroprene rubber and a chloroprene-methacrylate copolymer in the presence of a metal oxide and quinone dioxime dibenzoate.

DETAILED DESCRIPTION OF THE PREFERRED EMBODIMENTS

The chloroprene-methacrylate copolymer used in the composition of this invention as a blend rubber component may be any of the linear copolymers of chloroprene and methacrylates, such as saturated alkyl methacrylates, e.g. methyl methacrylate, ethyl methacrylate, butyl methacrylate, cyclohexyl methacrylate, ethylhexyl methacrylate, dodecyl methacrylate, stearyl methacrylate or the like, and unsuaturated alkyl methacrylates, e.g. allyl methacrylate, crotyl methacrylate, hexenyl methacrylate, oleyl methacrylate or the like, or the aralkyl methacrylates such as benzyl methacrylate or lower alkyl phenyl methacrylate.

The methacrylates are preferably $C_{1-20}$ saturated or unsaturated alkyl or allyl or aralkyl methacrylates.

These linear copolymers may be prepared by well known polymerization techniques such as copolymerizing chloroprene with a methacrylate in the presence of an organo-aluminum compound, e.g. alkyl aluminum. Ultraviolet radiation may also be applied during the copolymerization. The catalyst may be a mixture of an organoaluminum compound and a vanadium compound such as vanadium chloride. Also, two or more methacrylates can be copolymerized with chloroprene.

In the copolymerization, the ratio of the chloroprene component to the methacrylate component may vary greatly but is usually from about 1:10 to about 10 : 1, preferably from about 1:2 to about 2:1.

The chloroprene-methacrylate copolymer can be blended with the chloroprene rubber in any conventional manner. It is, however, preferable to blend them by a roller mill before the addition of the vulcanizing agents. The chloroprene-methacrylate copolymer has a high compatibility with chloroprene rubber so that the blending operation can be easily done during the roller kneading operation.

The ratio of the chloroprene-methacrylate copolymer to the chloroprene rubber may be readily determined depending upon the desired properties of the final product but is usually from about 5:95 to about 25:15, preferably from about 15:85 to about 75:25 to afford a moldability which is similar to that of conventional chloroprene rubber.

The chloroprene-methacrylate copolymer can have any desirable average molecular weight however, it is preferable to use a chloroprene-methacrylate copolymer having about the same or a slightly lower average molecular weight than that of the chloroprene rubber with which it is blended. This will enable the copolymer to be easily blended with the chloroprene rubber on the roller mill. It is also possible to add a relatively small amount of another type of rubber or a rubber like copolymer.

The vulcanization of the blended rubber may be effected in the presence of a metal oxide and quinone dioxime dibenzoate as a vulcanizing agent. High pressures and high temperatures may be employed to obtain a vulcanized blended rubber having the desired properties. The metal oxide and quinone dioxime benzoate may be admixed with either component of the blend before or after the blending of the chloroprene-methacrylate copolymer with the chloroprene rubber by the roller mill.

The quantity of quinone dioxime dibenzoate per 100 parts by weight of the blended rubber used may vary but is preferably from 0.1 to 9 parts by weight. The vulcanization velocity of chloroprene by the quinone dioxime dibenzoate is more than ten times greater than that of the chloroprene-methacrylate copolymer. Accordingly, the quantity of quinone dioxime dibenzoate added can be decreased depending upon the amount of chloroprene rubber in the blended rubber. It is necessary to add quinone dioxime dibenzoate and a metal oxide in the preparation of the chloroprene rubber composition of the present invention. The optimum vulcanized chloroprene rubber composition cannot be obtained without the addition of a metal oxide and quinone dioxime dibenzoate.

The desirable metal oxides include zinc oxide, magnexium oxide, lead peroxide and mixture thereof. The quantity of the metal oxide used may be redaily determined depending on the final properties desired, but from about 02. − 10 parts by weight per 100 parts by weight of the blended rubber is usual. It is possible to add a vulcanization accelerator together with the vulcanizing agents. For example, 2-mercaptoimidazoline or 2-mercaptobenzthiazole may be preferably used for accelerating the initial vulcanizing velocity.

It is also possible to add without deleteriously effecting the composition an antioxidant, carbon black or another conventional filler; a heat stabilizer; and a conventional modifier which are added to conventional latex or rubbers. These ingredients may be added in any desirable order, for example they can be added before or after the addition of the vulcanizing agents, vulcanizing auxiliary agent and vulcanization accelerator, all at once or in steps.

The vulcanization is preferably performed at a temperature of from 120°–190°C, under a pressure of from 20–220 kg/cm² and for from 40–120 minutes. It is possible to use with the blend rubber of this invention any desirable type of mold used in conventional molding vulcanization of ordinary and special rubbers.

The chloroprene rubber compositions of the present invention have excellent rubber elasticity and surface gloss and may be used in all fields in which chloroprene type rubbers are now used. The compositions of the present invention may most advantageously be used in the fields in which high thermal aging resistance and oil resistance are required, such as conveyor belts, heat resistant tubing, hose, packing, and the like.

Having generally described the invention, a more complete understanding can be obtained by reference to certain specific examples, which are included for purposes of illustration only and are not intended to be limiting unless otherwise specified.

The comparative tests contained in the following examples measuring the tensile strength and the residual elongation of the thermally aged vulcanized chloroprene rubber composition of the present invention are remarkably higher than those of the vulcanized chloroprene rubber treated in the same manner. In addition, the rate volume change of the composition of this invention which is indicative of the oil resistance of the present compositions is remarkably higher than that of conventional vulcanized chloroprene rubber.

In the examples, the words "percent" and "part" are "percent by weight" and "part by weight", respectively.

EXAMPLE 1 AND REFERENCE 1

The following ingredient were mixed and kneaded by a roller mill having an 8 inch length and kept at 25°C.

|  | Reference 1 parts | Example 1 parts |
|---|---|---|
| Chloroprene rubber (Neoprene WRT) | 100 | 75 |
| Chloroprene-methyl methacrylate copolymer | — | 25 |
| Magnesia | 4 | 4 |
| Antioxidant | 2 | 2 |
| Stearic acid | 1 | 1 |
| SRF carbon black | 29 | 29 |
| 2-Mercaptoimidazoline | — | — |
| Zuinone dioxime dibenzoate | 0.2 | 0.5 |

The chloroprene-methyl methacrylate copolymer is a linear copolymer (alternative structure) having 56% chloroprene units which has an intrinsic viscosity of 2.5 dl/g in chloroform at 30°C, and a Mooney viscosity of $ML_{1+4}$ 61 at 100°C.

The quantity of quinone dioxime dibenzoate used in Reference 1, is different from that of Example 1 because of the presence of the copolymer in Example 1. The quantity of quinone dioxime dibenzoate was determined so as to give a flat torque curve under 60 kg/cm at 150°C for 100 minutes in a vulcanization test by an oscillating disc rheometer for the compositions. That is, to provide the same vulcanization rate.

The blending was smoothly performed without any trouble. The resulting composition was put into a mold having the dimensions 15 cm × 15 cm ×0.2 cm and was vulcanized at 150°C under a pressure of 200 kg/cm² for 100 minutes by a steam heating press, whereby a glossy vulcanized rubber sheet was obtained.

The sheet was perforated in a dambel shape to make a test piece which was used in the following tests. The tensile strength and elongation of the test pieces were measured and are shown in Table I.

TABLE I

|  | Reference 1 | Example 1 |
|---|---|---|
| Tensile strength (kg/cm²) | 227 | 192 |
| Elongation (%) | 540 | 430 |

The test pieces perforated from the vulcanized rubber sheets were then put in a gear oven and heated at 150°C for 24 hours and 72 hours and the tensile strength and the elongation of the test pieces were measured. The results are shown in Table II.

TABLE II

| Aging at 150°C for 24 hours | Reference 1 | Example 1 |
|---|---|---|
| Tensile strength (kg/cm²) | 72 | 164 |
| Elongation (%) | 120 | 220 |
| Aging at 150°C for 72 hours |  |  |
| Tensile strength (kg/cm²) | 33 | 178 |
| Elongation (%) | <20 | <20 |

The residual elongation of the chloroprene rubber (Reference 1) after 24 hours was 22.2% while the residual elongation of the blend of the chloroprene-methylmethacrylate copolymer and chloroprene after 24 hours was 51.2%. The latter thermal aging resistance is clearly higher than the former thermal aging resistance.

EXAMPLE 2

The following ingredients were mixed, kneaded and vulcanized in accordance with Example 1.

| Chloroprene rubber (Neoprene WRT) | 25 | parts |
|---|---|---|
| Chloroprene-methylmethacrylate copolymer | 75 | parts |
| Magnesia | 4 | parts |
| Antioxidant | 2 | parts |
| Stearic acid | 1 | part |
| SRF carbon black | 29 | parts |
| 2-Mercaptoimidazoline | 0.5 | parts |
| Quinone dioxime dibenzoate | 6 | parts |

The thus obtained vulcanized composition was heated at 150°C in a gear oven for the specific times indicated to determine the thermal aging properties and the tensile strength and the elongation were then measured. The results are shown in Table III.

TABLE III

|  | Tensile strength (kg/cm²) | Elongation (%) |
|---|---|---|
| Before thermal aging | 147 | 369 |
| 24 hours aging at 150°C | 204 | 231 |
| 72 hours aging at 150°C | 280 | 86 |

The residual elongation of the composition after thermal aging for 24 hours was 62.6% which is higher than that of Example 1. The better thermal aging is considered to be the result of the increased ratio of the chloroprene-methylmethacrylate copolymer to chloroprene rubber in the blend.

EXAMPLE 3 AND REFERENCES 2 AND 3

The following ingredients were mixed, kneaded and vulcanized in accordance with Example 1.

|  | Example 3 (parts) | Reference 2 (parts) | Reference 3(parts) |
|---|---|---|---|
| Chloroprene rubber (Neoprene WRT) | 75 | 100 | 100 |
| Chloroprene-methyl methacrylate copolymer | 25 | — | — |
| Magnesia | 4 | 4 | 4 |
| Antioxidant | 2 | 2 | 2 |
| Stearic acid | 1 | 1 | 1 |
| SRF carbon black | 29 | 29 | 29 |
| Zinc Oxide | 5 | 5 | 5 |
| 2-Mercaptoimidazoline | — | — | 0.5 |
| Quinone dioxime dibenzoate | 0.5 | 0.2 | — |

Zinc oxide was added to the formula of Example 1. The standard zinc oxide vulcanized chloroprene rubber is shown by Reference 3. The tensile strength and elongation of the compositions before and after thermal aging are shown in Table IV.

TABLE IV

|  | Example 3 | Reference 2 | Reference 3 |
|---|---|---|---|
| Before thermal aging |  |  |  |
| Tensile strength (kg/cm$^2$) | 173 | 174 | 196 |
| Elongation (%) | 604 | 734 | 350 |
| 40 hours aging at 150°C |  |  |  |
| Tensile strength (kg/cm$^2$) | 176 | 157 | 81 |
| Elongation (%) | 284 | 225 | 70 |
| 96 hours aging at 150°C |  |  |  |
| Tensile strength (kg/cm$^2$) | 170 | 120 | 68 |
| Elongation (%) | 90 | 65 | <20 |

The residual elongation of the composition of Example 3 containing the chloroprene-methyl methacrylate copolymer after 40 hours was 47.0% while the residual elongation of the chloroprene rubber of Reference 2 was 30.7% and that of the standard chloroprene rubber of Reference 3 was 20.0%. The high thermal aging resistance of the composition of the present invention is clearly demonstrated.

The rate of volume change of the above compositions was determined. The compositions were immersed in the following oils held at 100°C for 70 hours and the rate of volume change was measured. The rate of volume change of the chloroprene rubber of Reference 3 was +13.4% in ASTM No. 1 oil and +89.6% in ASTM No. 3 oil.

On the other hand, the rate of volume change of the composition of the invention was +10.1% in ASTM No. 1 oil and +72.5% in ASTM No. 3 oil. The composition of Example 3 has a higher oil resistance.

EXAMPLE 4

The following ingredients were mixed, kneaded and vulcanized in accordance with Example 3.

| Chloroprene rubber (Neoprene WRT) | 25 | parts |
|---|---|---|
| Chloroprene-methyl methacrylate copolymer | 75 | parts |
| Magnesia | 4 | parts |
| Antioxidant | 2 | parts |
| Stearic acid | 1 | part |
| SRF carbon black | 29 | parts |
| Zinc oxide | 5 | parts |
| 2-Mercaptoimidazoline | 0.5 | parts |
| Quinone dioxime dibenzoate | 6 | parts |

In other words, zinc oxide is added to the formula of Example 2. The tensile strength and the elongation of the composition were measured before and after thermal aging and are shown in Table V.

TABLE V

|  | Tensile strength (kg/cm$^2$) | Elongation (%) |
|---|---|---|
| Before thermal aging | 124 | 380 |
| 40 hours aging at 150°C | 174 | 280 |
| 96 hours aging at 150°C | 220 | 150 |

The residual elongation of the composition after 40 hours of thermal aging was 73.8% which is higher than that of Example 3. The better thermal aging is considered to be the result of the increased ratio of the chloroprene-methyl methacrylate copolymer to chloroprene rubber in the blend. The oil resistance of the composition was measured by the method of Example 3. The rate of volume change of the composition was +3.3% in ASTM No. 1 oil and +37.5% in ASTM No. 3 oil. The composition has a higher oil resistance than that of Example 3.

EXAMPLE 5

The following ingredients were mixed, kneaded and vulcanized in accordance with Example 1.

|  | Example 5 parts | Reference 4 parts |
|---|---|---|
| Chloroprene (Neoprene WRT) | 85 | 100 |
| Chloroprene-methylmethacrylate-n-butyl methacrylate copolymer* | 15 | — |
| Lead peroxide | 4 | 4 |
| Antioxidant | 2 | 2 |
| Stearic acid | 1 | 1 |
| SRF carbon black | 29 | 29 |
| Zinc oxide | 5 | 5 |
| 2-Mercaptoimidazoline | 0.5 | — |
| Quinone dioxime dibenzoate | 6** | 0.2** |

*The chloroprene-methylmethacrylate-n-butyl methacrylate copolymer is a linear copolymer having 55% chloroprene, 21% methylmethacrylate, and 24% n-butyl methacrylate and an intrinsic viscosity of 1.75 dl/g in chloroform at 30°C and a Mooney viscosity of ML$_{1+4}$ 63 at 100°C.
**The quantity of quinone dioxime dibenzoate used in Reference 4 is the amount necessary to provide the same vulcanization velocity as in Example 5.

The tensile strength and elongation of the compositions are shown in Table VI.

TABLE VI

|  | Example 5 | Reference 4 |
|---|---|---|
| Before thermal aging |  |  |
| Tensile strength (kg/cm$^2$) | 170 | 182 |
| Elongation (%) | 702 | 754 |
| 40 hours aging at 150°C |  |  |
| Tensile strength (kg/cm$^2$) | 161 | 163 |
| Elongation (%) | 270 | 235 |

The residual elongation of the composition of Example 5 after 40 hours at 150°C was 38.5% and that of Reference 4 was 31.8%. The better thermal aging is considered to be the result of the addition of the chloroprene-methylmethacrylate-n-butyl methacrylate copolymer (15 parts). Thus, the thermal aging resistance of the composition of Example 5 is clearly higher than that of Reference 4.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A thermal aging and oil resistant chloroprene rubber composition which comprises:
   a. a linear copolymer of chloroprene and a methacrylate selected from the group consisting of alkyl, allyl and aralkyl methacrylate having 1 to 20 carbon atoms, wherein said chloroprene annd said methacrylate are copolymerized in a ratio of from about 1 : 10 to about 10 : 1; and
   b. polychloroprene homopolymer, wherein the ratio of (a) to (b) is from about 5 : 95 to 85 : 15, which are vulcanized in the presence of
   c. a metal oxide; and
   d. quinone dioxime dibenzoate.

2. The chloroprene rubber composition of claim 1, wherein the metal oxide is selected from the group consisting of zinc oxide, magnesium oxide, lead peroxide and mixtures thereof.

3. The chloroprene rubber composition of claim 1, containing a vulcanization accelerator selected from the group consisting of 2-mercaptoimidazoline or 2-mercaptobenzthiazole.

4. The chloroprene rubber composition of claim 1, wherein from 0.2 to 10parts by weight of said metal oxide and from 0.1 to 9 parts by weight of quinone dioxime dibenzoate is added per 100 parts by weight of the mixture of said linear copolymer of chloroprene and a methacrylate and polychloroprene homopolymer.

* * * * *